(12) United States Patent
Terrill et al.

(10) Patent No.: US 9,793,706 B2
(45) Date of Patent: Oct. 17, 2017

(54) CURRENT LIMITING SYSTEMS AND METHODS

(71) Applicant: Vishay-Siliconix, Santa Clara, CA (US)

(72) Inventors: Kyle Terrill, Santa Clara, CA (US); Trang Vu, Cupertino, CA (US)

(73) Assignee: Vishay-Siliconix, Santa Clara, CA (US)

( * ) Notice: Subject to any disclaimer, the term of this patent is extended or adjusted under 35 U.S.C. 154(b) by 0 days.

(21) Appl. No.: 13/867,964

(22) Filed: Apr. 22, 2013

(65) Prior Publication Data

US 2013/0279057 A1    Oct. 24, 2013

Related U.S. Application Data

(60) Provisional application No. 61/687,224, filed on Apr. 20, 2012.

(51) Int. Cl.
*H02H 9/02* (2006.01)

(52) U.S. Cl.
CPC .............. *H02H 9/02* (2013.01); *H02H 9/025* (2013.01)

(58) Field of Classification Search
USPC ........................................................ 361/93.9
See application file for complete search history.

(56) References Cited

U.S. PATENT DOCUMENTS

| 5,151,619 | A | 9/1992 | Austin et al. |
| 5,543,733 | A | 8/1996 | Mattos et al. |
| 5,614,881 | A | 3/1997 | Duggal et al. |
| 5,635,861 | A | 6/1997 | Chan et al. |
| 5,841,649 | A | 11/1998 | Willett et al. |
| 5,867,356 | A | 2/1999 | Duggal et al. |
| 5,872,460 | A | 2/1999 | Bennett et al. |
| 5,877,646 | A | 3/1999 | Jorg |
| 5,926,056 | A | 7/1999 | Morris et al. |
| 5,933,027 | A | 8/1999 | Morris et al. |
| 5,952,848 | A | 9/1999 | Morris |
| 5,990,705 | A | 11/1999 | Lim |
| 6,008,627 | A | 12/1999 | Narita |
| 6,150,843 | A | 11/2000 | Shiffer et al. |

(Continued)

FOREIGN PATENT DOCUMENTS

| CN | 1839359 | 9/2006 |
| CN | 101488711 | 7/2009 |

(Continued)

*Primary Examiner* — Ronald W Leja (57) ABSTRACT

Presented systems and methods can facilitate efficient switching and protection in electronic systems. A system can comprise: an input operable to receive a signal; an adjustable component configurable to operate in a first mode which includes a low resistance and the component configurable to operate in a second mode which includes a current limiting operation in which the second mode enables continued operation in conditions that are unsafe for operation in the first mode; and an output operable to forward a signal. The adjustable component can be configurable to turn off if unsafe to operate in either the first mode or second mode. The first mode can include a relatively large component configuration with a relatively low drain to source on resistance. Utilizing a small component configuration in the second mode can include a relatively increased gate to source voltage compared to a large component configuration in the second mode.

16 Claims, 6 Drawing Sheets

(56) References Cited

U.S. PATENT DOCUMENTS

| | | | |
|---|---|---|---|
| 6,215,435 B1 | 4/2001 | Parry et al. | |
| 6,337,591 B1 | 1/2002 | Maggiolino | |
| 6,552,889 B1 | 4/2003 | Huang et al. | |
| 7,224,155 B2 | 5/2007 | Bo et al. | |
| 7,728,565 B2* | 6/2010 | Wyatt | 323/269 |
| 7,768,339 B2 | 8/2010 | Suzuki | |
| 8,421,426 B2* | 4/2013 | La Rosa et al. | 323/272 |
| 8,836,404 B2 | 9/2014 | Vu | |
| 9,438,221 B2* | 9/2016 | Asam | H03K 17/063 |
| 2006/0290203 A1 | 12/2006 | Muller | |
| 2007/0206338 A1 | 9/2007 | Ishino | |
| 2008/0165465 A1 | 7/2008 | Rallabandi et al. | |
| 2009/0195080 A1* | 8/2009 | Diab | H04L 12/10 307/113 |
| 2010/0052647 A1* | 3/2010 | Forghani-zadeh | H03K 17/122 323/349 |
| 2010/0066336 A1 | 3/2010 | Araki et al. | |
| 2010/0090665 A1 | 4/2010 | Jian | |
| 2010/0244790 A1 | 9/2010 | La Rosa et al. | |
| 2010/0327829 A1 | 12/2010 | Bucur et al. | |
| 2013/0265017 A1* | 10/2013 | La Rosa et al. | 323/271 |
| 2013/0279057 A1 | 10/2013 | Terril et al. | |
| 2014/0035657 A1 | 2/2014 | Vu | |
| 2015/0002192 A1 | 1/2015 | Vu | |

FOREIGN PATENT DOCUMENTS

| | | |
|---|---|---|
| JP | 2000-013991 | 1/2000 |
| JP | 2005198439 | 7/2005 |
| JP | 2008-146576 | 6/2008 |

\* cited by examiner

Performing a current monitoring process.

520

Performing a configuration process based upon the current monitoring process results in which one configuration enables continued operation in conditions that are unsafe for operation in another configuration.

610
Configuring a component to operate in a first mode (e.g., normal mode, etc.) in which a relatively large component configuration is activated or implemented.

620
Configuring a component to operate in a second mode (e.g., current protection mode, etc.) in which a relatively small component configuration is activated or implemented.

630
Configuring a component for operation in a third mode which includes reducing current to a component.

CURRENT LIMITING SYSTEMS AND METHODS

RELATED APPLICATIONS

This Application claims the benefit of and priority to Provisional Application No. 61/687,224, entitled CURRENT LIMITING SYSTEMS AND METHODS, filed on Apr. 20, 2012, which is hereby incorporated by reference.

FIELD OF THE INVENTION

The present invention relates to electronic systems and methods. In particular, the present invention relates to current protection in electronic systems and methods.

BACKGROUND OF THE INVENTION

Electronic systems and circuits have made a significant contribution towards the advancement of modern society and are utilized in a number of applications to achieve advantageous results. Controlling voltage and current in the electronic systems and circuits is typically very important and failure to adequately control voltage and current can be detrimental. In particular, overload or short circuit conditions can have adverse impacts. Adverse impacts associated with an over load or short circuit condition can include over heating or temperature issues. However, traditional attempts at controlling current can be ineffective at preventing damage and often introduce other undesirable impacts or side effects.

Figure 1:
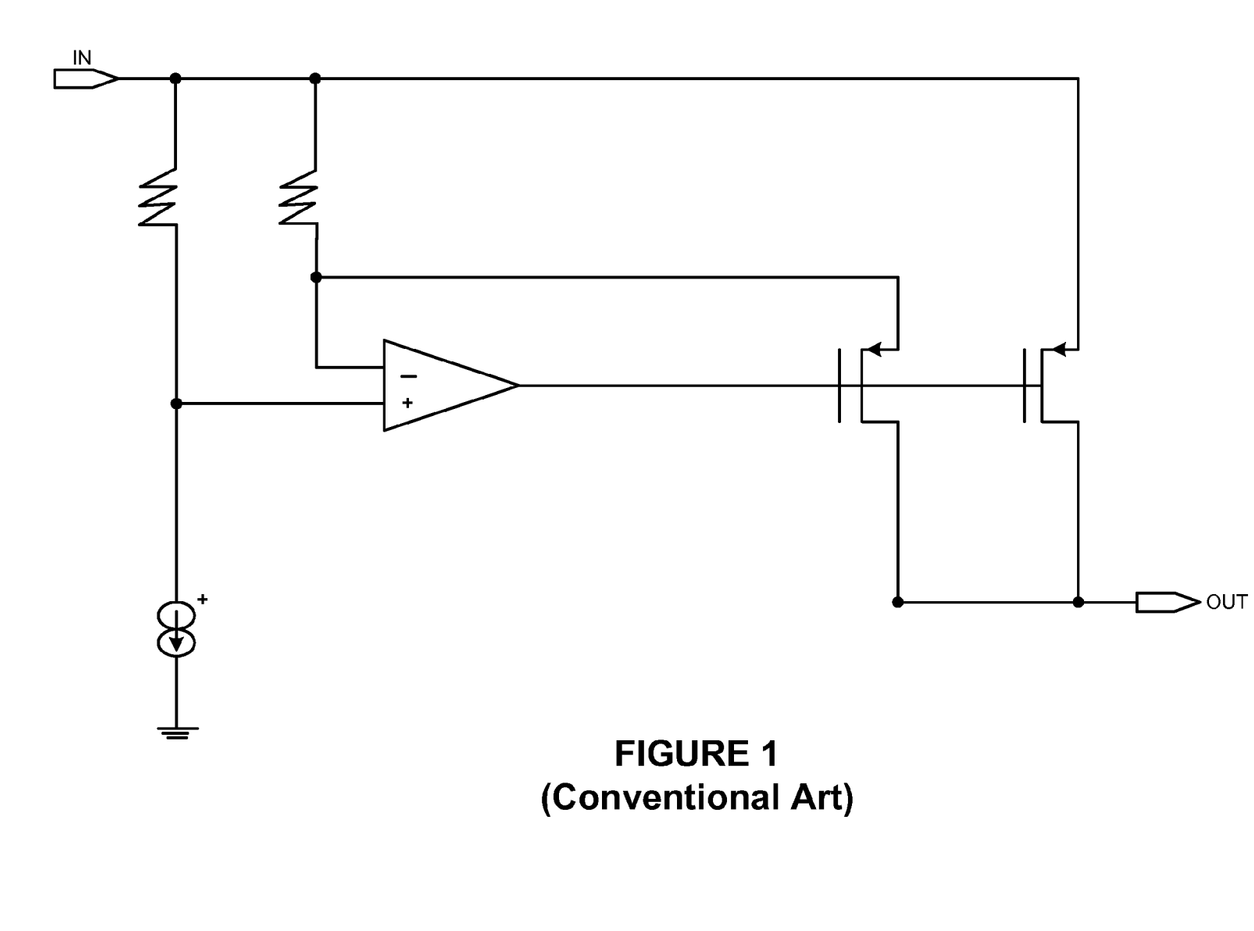
FIG. 1 is a block diagram of an exemplary traditional system.

Some traditional approaches to current control attempt to implement current limiting. FIG. 1 is a diagram of an exemplary traditional system. Current limiting is a feature that is more and more attempted in various switch applications. Protection measures should be engaged as quickly as possible for good protection of both the source (e.g., power supply, etc.) and the load. When a circuit detects an overload or short circuit condition, traditional protection approaches typically attempt to shut off the device or system experiencing the overload or short circuit condition. Conventional approaches to shutting off a device may provide overload protection. However, shutting off a device or system typically has undesirable side effects of interrupting utilization of the device or system.

Traditional approaches to current limiting typically give rise to a number of issues. Due to the advantages of a very low on resistance between drain and source of a transistor when operating as a switch that is in an on state (Rds-on), it is often desirable for a device to be designed with high transconductance. However, a high transconductance (gm) can translate into a low gate to source voltage when the device operates in a current limit mode. In this region of operation (e.g., low VGS, and high VDS, etc.) power devices typically exhibit improved or maximum sensitivity to threshold voltage reduction caused by temperature increase. A positive detrimental feedback effect often occurs since local temperature increases cause reduced threshold voltages which then leads to additional increased current that causes a further increase in temperature. This positive feedback usually leads to thermal runaway in which a localized region of a MOSFET is damaged. As a result, when going into traditional current limit mode, power devices can be susceptible to being easily damaged. Some conventional approaches attempt to utilize components that have restricted or unfavorable characteristics (e.g., ineffective or reduced performance characteristics, poor gain characteristics, etc.).

SUMMARY

Presented systems and methods can facilitate efficient and effective switching and protection in electronic systems. To overcome or reduce many shortcomings of traditional approaches, the presented systems and methods facilitate realization of advantageous low resistance operation in normal operating situations and also facilitate reduction of adverse affects otherwise associated with current limiting situations. The systems and methods enable dynamic and flexible adjustment for operation in different modes (e.g., normal mode, current limit mode, etc.). In one embodiment, a normal mode enables low resistance operation and a current limiting mode enables current protection with minimal or no thermal run-away. In one exemplary implementation, the systems and methods enable effective increases in the gate to source voltage of a MOSFET included in a device (e.g., power device, load switch, etc.) when operating in current limit mode and the increase in gate to source voltage moves the MOSFET's operating condition to a region where thermal runaway is reduced or no longer occurs.

In one embodiment, a system comprises: an input component operable to receive a signal; an adjustable component coupled to the input component, the adjustable component configurable to operate in a first mode which includes a low resistance and the adjustable component configurable to operate in a second mode which includes a current limiting operation in which the second mode enables continued operation in a condition that is unsafe for operation in the first mode; and an output operable to forward a signal. The adjustable component can be configurable to turn off when a condition becomes unsafe to operate in both the first mode and second mode. In one embodiment, a relatively large component configuration is activated in the first mode and a relatively small component configuration is activated in the second mode. The first mode can include a relatively low drain to source on resistance compared to the second mode. Utilizing a relatively small component configuration of the second mode can include a relatively increased gate to source voltage as compared to an attempt utilizing a relatively large component configuration in the second mode.

In one embodiment, a system comprises an adjustable component and a control component. The control component can include: an amplifier coupled to an input component; a first resistor and a second resistor coupled to the amplifier, a control transistor coupled to the amplifier; a sense transistor coupled to the amplifier, and a switch coupled to the amplifier. The adjustable component can include: a small transistor component coupled to the amplifier, and a large transistor component coupled to the switch, wherein the large transistor component is relatively large with respect to the small transistor component. A current source can be coupled to the first resistor. The sense transistor, the small transistor component, and the large transistor component can share drain connections. The gates of the sense transistor and small transistor can be coupled to one another. The amplifier is an error amp included in a control loop. In one exemplary implementation, the switch is closed during normal operation and the switch connects a gate of the large transistor component to gates of the sense transistor and the small transistor component. If an over-current condition is detected the switch can open, disconnecting the large transistor component from the small transistor component and the sense transistor, while the control transistor can turn on shorting the gate of large transistor component to the input component. The gates of small transistor component and sense transistor can be regulated to support a designated current limit level.

DESCRIPTION OF THE DRAWINGS

The accompanying drawings, which are incorporated in and form a part of this specification, illustrate embodiments of the invention by way of example and not by way of limitation. The drawings referred to in this specification should be understood as not being drawn to scale except if specifically noted.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and control component under analysis have not been described in detail as not to unnecessarily obscure aspects of the present invention.

Presented systems and methods can facilitate efficient switching and protection in electronic systems. In one embodiment, when an over-current or short circuit condition occurs, the configuration adjustment enables the components to continue to operate at a greater predefined current level that is safe for the application instead of immediately shutting off the power completely to the device. In one exemplary implementation, as long as conditions remain in a safe region for the current limit mode, a device can continue to operate in the current limit mode until the over-current or short circuit condition is removed or resolved. If a situation arises in the current limit mode in which it is not safe (e.g., the die temperature exceeds a certain level even in current limit mode, the increase in over-current is too great, etc.) the power device can be completely turned off.

Figure 2:
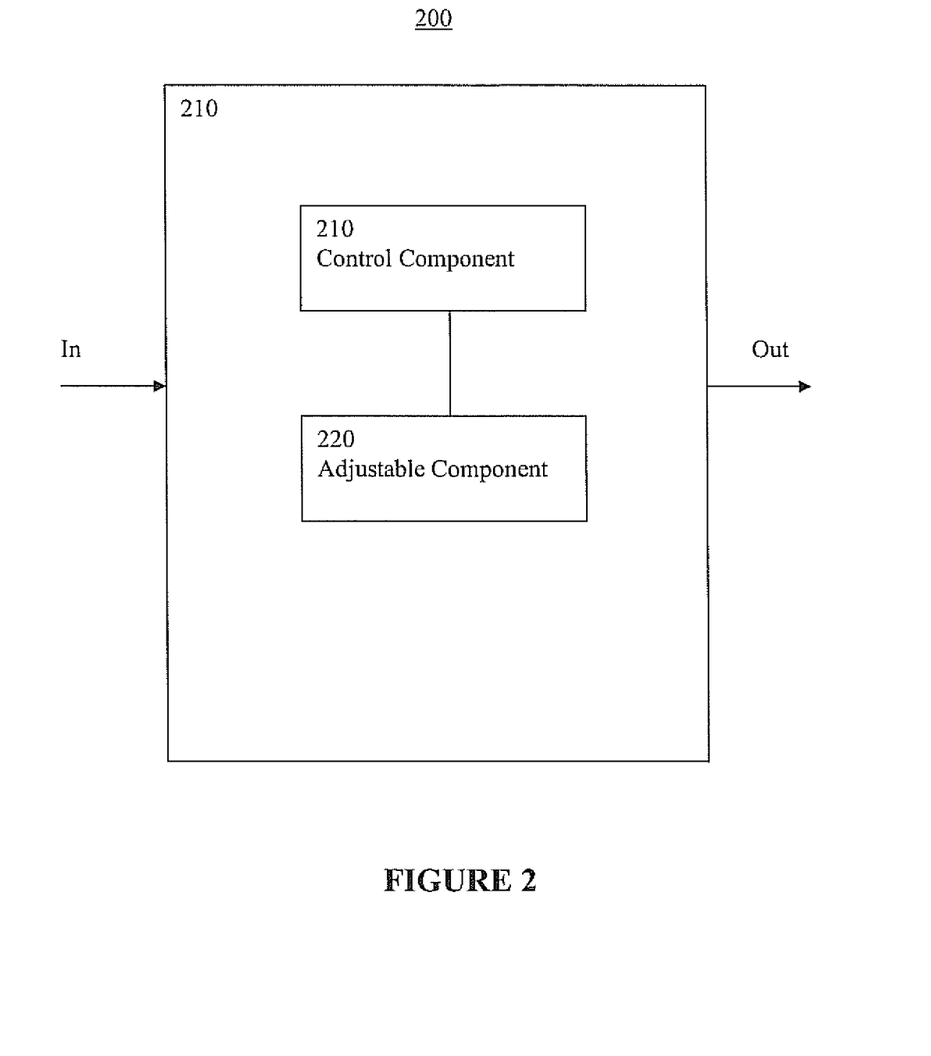
FIG. 2 is block diagram of an exemplary system in accordance with one embodiment of the present invention.

FIG. 2 is block diagram of an exemplary system 200 in accordance with one embodiment of the present invention. In one embodiment, system 200 enables efficient switching (e.g., controlling current delivery with minimal voltage drop when a switch is on, preventing current delivery when the switch is off, etc.) while protecting against detrimental current levels (e.g., overload current, short circuit, etc.) in an effective manner, including avoiding thermal run-away conditions. System 200 includes a control component 210 and an adjustable component 220. Control component 210 is coupled to adjustable component 220.

The components of system 200 cooperatively operate to enable efficient switching and current protection. The adjustable component 220 can dynamically change various characteristics, including characteristics that enable continued operation in conditions that are unsafe for operation under different characteristics (e.g., low resistance characteristics, current limiting characteristics, bias characteristics, gate to source voltage characteristics, operational regions, size, etc.). In one embodiment, the adjustable component 220 can be dynamically changed between a normal mode configuration and a current limiting mode configuration. The normal mode configuration can include a low resistance characteristic. The current limiting mode configuration can include current protection and thermal run-away protection. In one embodiment, current protection characteristics handle detrimental or adverse current conditions while thermal run-away protection characteristics mitigate or avoid conditions susceptible to thermal run-away. The control component 210 facilitates control or initiation of adjustments by adjustable component 220.

It is appreciated that adjustable component 220 can include a variety of implementations. When operating in a normal mode the adjustable component 220 can be configured in a first configuration. In one embodiment, the first configuration includes a low resistance characteristic between drain and source in an on state (Rds-on). When operating in a current limiting mode, the adjustable component 220 can be configured in a second configuration. In one embodiment, the first configuration includes a first transistor configuration (e.g., large transistor configuration, etc.) and the second configuration includes a second transistor configuration (e.g., a small transistor configuration, etc.). In one embodiment, a second configuration in a current limiting mode can include an increased gate to source voltage characteristic with respect to the gate to source voltage of a first configuration in a current protection mode. In one exemplary implementation, a second component configuration (e.g., relatively small, etc.) in a current protection mode has an increased gate to source voltage characteristic with respect to a first component configuration (e.g., relatively large, etc.) in a current protection mode.

The characteristics of adjustable component 220 can correspond to the configuration or size of the components included in adjustable component 220. In one embodiment, adjustable component 220 includes a first transistor configuration and a second transistor configuration. The first transistor configuration can include a first large transistor configuration and the second transistor configuration can include a second small transistor configuration. In one embodiment, the first large transistor configuration is relatively large with respect to the second small transistor configuration. In one exemplary implementation, a large transistor configuration can be two or more times larger than a small transistor configuration. In one exemplary implementation with a 3 Amp current limit, the size ratio of the large configuration to the small configuration can be 1 to 10, 1 to 20, etc. (e.g., the small configuration is $\frac{1}{10}$, $\frac{1}{20}$ etc. of the large configuration size). In one exemplary implementation with a 300 milli-Amp current limit the size ratio of the large configuration to the small configuration 1 to 50, 1 to 100, etc. (e.g., the small configuration is ⅟₅₀, ⅟₁₀₀ etc. of the large configuration size). In one embodiment, a gate region threshold can be 1.7 to 3 volts. In one embodiment, a Vds is greater than 15 volts.

In one embodiment, during normal operation (e.g., no unreasonably adverse conditions, no over load conditions, no short circuit conditions, etc.) a large section or configuration is on and achieves low Rds-on. When the circuit operates in current limit conditions or current limit mode the large section or configuration of the device is off and the small section or configuration is on and "carries" the current. Due to its smaller size, the small section or configuration of the device utilizes a larger or greater gate to source voltage to achieve the desired current limit value. In one embodiment, the smaller configuration can enable the device to be in a much safer region of operation at a higher current than the large configuration. In one exemplary implementation, as a result of the larger gate to source voltage the smaller device is less susceptible to various adverse impacts otherwise associated with operating in a current limiting mode (e.g., thermal run-away, local burn or damage, etc.).

A first large transistor configuration can be sized to enable a first desirable characteristic (e.g., low resistance, etc.) and a second small transistor configuration can be sized to enable operation under conditions that would give rise to a second undesirable characteristic for the first large transistor configuration. In one embodiment, operation under a particular condition (e.g., current level, voltage level, etc.) may be undesirable for the large transistor (e.g., operation in an unstable region, thermal run-away region, etc.) while operation under the particular condition is acceptable for the second small transistor. In one exemplary implementation, a characteristic of the small transistor configuration (e.g., increased gate to source voltage, etc.) can enable acceptable continued operation under the conditions that would otherwise give rise to a second undesirable characteristic for the first large transistor configuration.

In one embodiment, the control component 210 controls changes to the characteristics of adjustable component 220. It is appreciated that the control component 210 can include a variety of implementations. Control component 210 can include a control loop. Control component 210 can include a sensing component. In one embodiment, the control component 210 is configured to detect an adverse current condition (e.g., overload condition, short circuit condition, etc.) and direct a configuration change in the adjustable component 220 to protect against the adverse current condition. Various techniques are possible for controlling the large and small sections or configurations. A system can include sense FETs which are used by a control loop for more exact monitoring of current. However, a sense FET is not a requirement, and a control loop is not a requirement and they are not necessarily included in some embodiments.

It is appreciated that relatively large and small configurations can be implemented in a variety of approaches. In one exemplary implementation, the small section or configuration can be turned off while the large section or configuration is turned on. In another exemplary implementation, the small section or configuration can also be turned on while the large section or configuration is turned on. In one embodiment, there are two separate gate control sections on the power device but the source and drain connections are shared. The small and large sections or configurations of a power device may be designed in an interdigitated manner. In one embodiment, the interdigitated manner can be designed so that minimum thermal heating occurs when only a section of the power device is carrying the current.

It is appreciated that the presented systems and methods can be flexibly implemented in a variety of configurations with various features. The presented systems and methods can also improve response time of the protection circuit in cases where very low Rds is required. In one exemplary implementation, the current limit control loop is faster due to the reduced gate capacitance loading when only a small section of the power device is carrying the current. Also, the device could also be advantageously split into more than two sections or configurations. The multiple sections or configurations can enable or provide better control over the gate to source voltage in different operating modes. In one embodiment, the device split or different configurations can offer advantages in different operating modes of the switch, like during startup when only a portion of the device may be used while charging an output capacitor to the input voltage.

It is appreciated that the presented systems and methods can be readily implemented in a variety of applications. Possible implementations can also include the use of distinct power devices of different sizes, as well as a monolithic integration of the power devices with the entire system. It is appreciated that the systems and methods can be implemented in a variety of devices or switches (e.g., a load switch, power switch, etc.).

Figure 3:
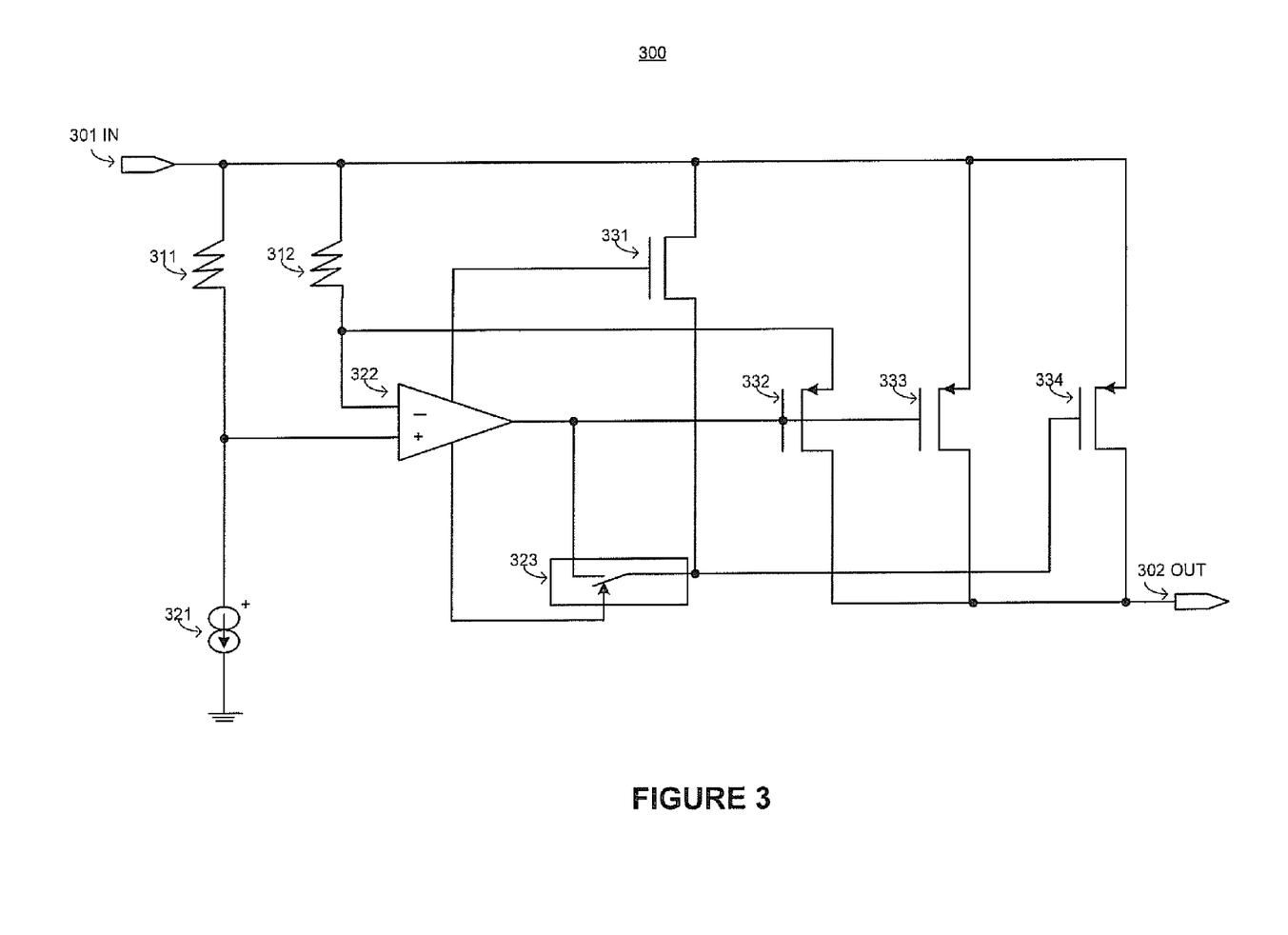
FIG. 3 is a block diagram of another exemplary system in accordance with one embodiment of the present invention.

FIG. 3 is a block diagram of an exemplary system 300 in accordance with one embodiment of the present invention. System 300 includes input component 301, output component 302, resistors 311 and 312, current source 321, amplifier 322, switch 323, control transistor 331, sense transistor 332, small transistor component 333 and large transistor component 334. Amplifier 322 is coupled to resistors 311 and 312, current source 321, amplifier 322, switch 323, and transistors 331, 332, and 333. Switch 323 is coupled to transistor 334 which is coupled to input 301 and output 302. In one embodiment input component 301, output component 302, resistors 311 and 312, current source 321, amplifier 322, switch 323, control transistors 331, sense transistor 332 are included in a control component (e.g., similar to control component 210) and small transistor component 333 and large transistor component 334 are included in an adjustable component (e.g., similar to adjustable component 220).

The components of system 300 cooperatively operate to enable system 300 to be configured in a normal mode and a current limiting mode. In one embodiment, large transistor component 334 is activated or turned on in a first large transistor configuration and the small transistor component 333 is activated in a second small transistor configuration. The large transistor component 334 can be turned off in the second small transistor configuration. In one exemplary implementation, the small transistor is deactivated or turned off in normal mode. In one exemplary implementation, the small transistor is activated or turned on in normal norm. The transistors 332, 333, and 334 can be p-channel metal oxide semiconductor (PMOS) field effect transistors (FETs). Large transistor 334 is a main or relatively large FET with respect to small transistor 333 and small transistor 333 is a relatively small FET with respect to large transistor 334 (e.g., small transistor 333 is ⅟₁₀, ½, ⅟₁₀₀, etc., of large transistor 334), and sense transistor 332 is a sensing FET. In one embodiment, the three transistors 332, 333 and 334 share the same drain connections (e.g., drain to the output component 302, etc.) with the gates of transistor 332 and 333 coupled to one another. In one exemplary implementation, the amplifier 322 is an error amp of a control loop.

In one embodiment, the resistors 311 and 312, current source 321, and the ratio between sense transistor 332 and small transistor 333 set a current limit level threshold. During normal operation switch 323 is closed, connecting the gate of large transistor 334 to the gates of sense transistor 332 and small transistor 333. In one exemplary implementation, when an over-current condition is detected, switch 323 opens disconnecting large transistor 334 from small transistors 333 and sense transistor 332. Control transistor 331 turns on and shorts the gate of large transistor 334 to input component 301. The control loop regulates the gates of small transistor 333 and sense transistor 332 to support the required or designated current limit level. It is appreciated that components of system 300 can include a variety of component implementations (e.g., resistor 312 can be a variable resistor component, current source 321 can be an adjustable current source, etc.).

Figure 4:
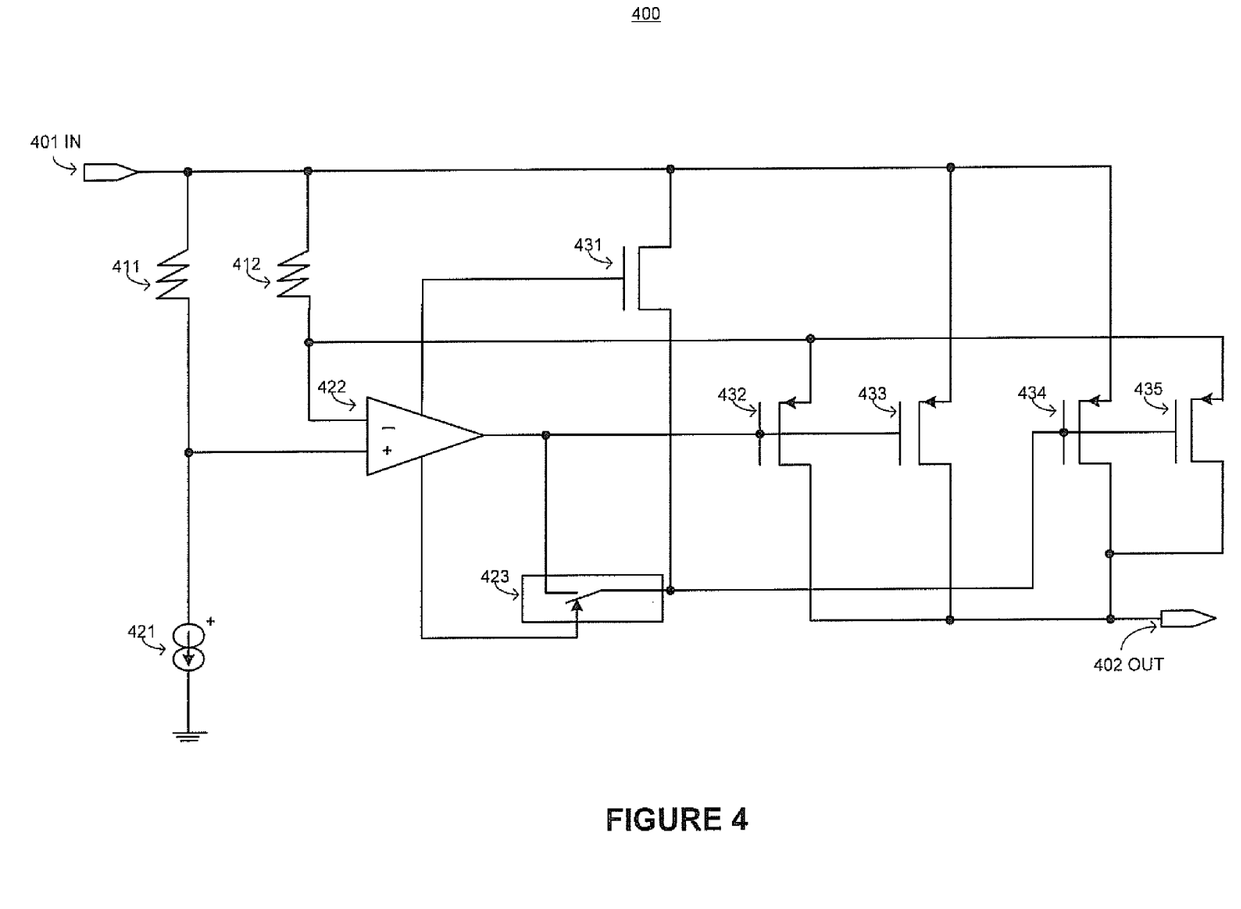
FIG. 4 is a block diagram of another exemplary system in accordance with one embodiment of the present invention.

FIG. 4 is a block diagram of an exemplary system 400 in accordance with one embodiment of the present invention. In one embodiment system 400 is similar to system 200. System 400 includes input component 401, output component 402, resistors 411 and 412, current source 421, amplifier 422, switch 423, control transistor 431, sense transistors 432 and 435, small transistor component 433 and large transistor component 434. Amplifier 422 is coupled to resistors 411 and 412, current source 421, amplifier 422, switch 423, and transistors 431, 432, and 433. Switch 423 is coupled to transistor 434 and transistor 435 which is coupled to output 402. In one embodiment input component 401, output component 402, resistors 411 and 412, current source 421, amplifier 422, switch 423, control transistors 431, sense transistors 432 and 435 are included in a control component (e.g., similar to control component 210) and small transistor component 433 and large transistor component 434 are included in an adjustable component (e.g., similar to adjustable component 220).

The components of system 400 cooperatively operate to enable system 400 to be configured in a normal mode and a current limiting mode. In one embodiment, large transistor component 434 is activated or turned on in a first large transistor configuration and the small transistor component 433 is activated in a second small transistor configuration. In one embodiment, sense transistor 435 facilitates refined sensing of current conditions.

Figure 5:
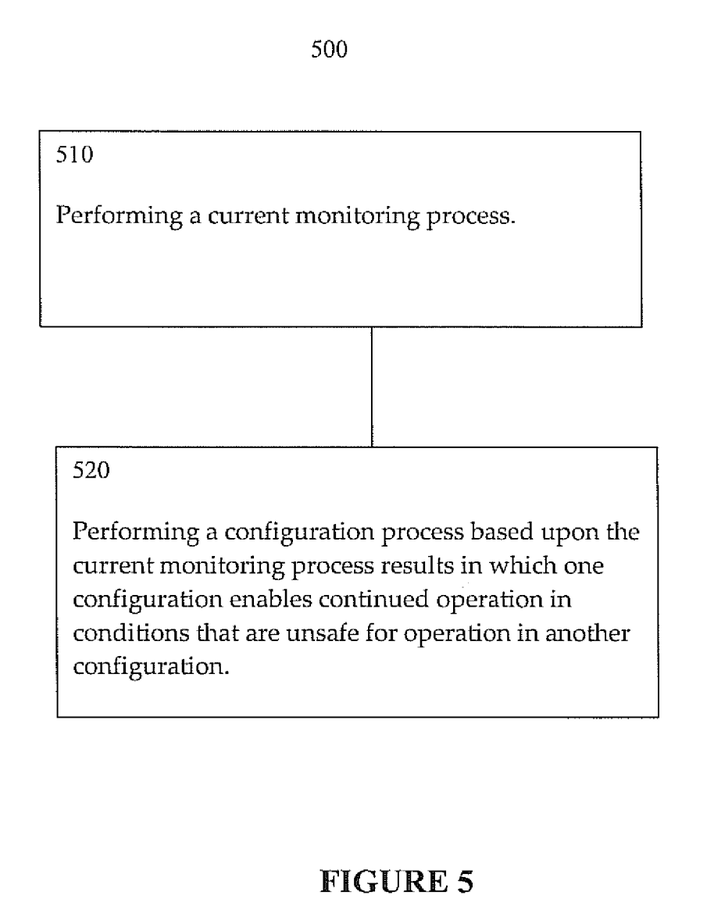
FIG. 5 is a block diagram of a protection method in accordance with one embodiment of the present invention.

FIG. 5 is a block diagram of a protection method in accordance with one embodiment of the present invention.

In block 510, a current monitoring process is performed. In one embodiment, the current monitoring process detects overload or short circuit conditions. In one exemplary implementation, a sense FET and control loop is utilized in the current monitoring process.

In block 520, a configuration process is performed in which one configuration enables continued operation in conditions that are unsafe for operation in another configuration. The implementation of one configuration or another configuration is based upon results of the current monitoring process in block 510. In one embodiment, one configuration includes a relatively low resistance when permitting current to pass as compared to another configuration. In one embodiment, one configuration includes an increased gate to source voltage condition with respect to another configuration. In one exemplary implementation, a normal configuration including a relatively large component has a relatively low resistance when permitting current to pass as compared to a normal configuration including a relatively small component. In one exemplary implementation, a current protection configuration including a relatively small component has an increased gate to source voltage condition with respect to a current protection configuration including a relatively large component. It is appreciated there can be a variety of configuration processes.

Figure 6:
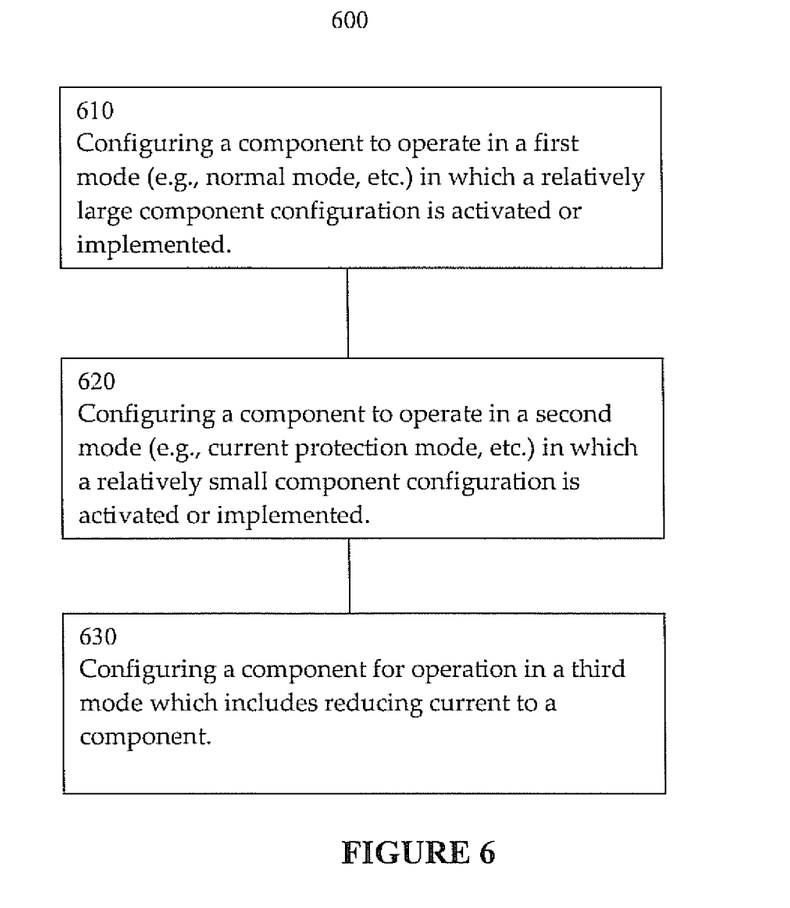
FIG. 6 is a block diagram of an exemplary configuration process in accordance with one embodiment of the present invention.

FIG. 6 is a block diagram of an exemplary configuration process 600 in accordance with one embodiment of the present invention. In one embodiment, configuration process 600 is one exemplary implementation of the configuration process performed in block 520.

In block 610, a component is configured to operate in a first mode (e.g., normal mode, etc.) in which a relatively large component configuration is activated or implemented. The first mode (e.g., normal mode, etc.) can include a low resistance configuration or operation as compared to a second mode (e.g., current protection mode, etc.). In one exemplary implementation, there is a low drain to source on resistance (Rds-on) when operating in the first mode.

In block 620, is configured to operate in a second mode (e.g., current protection mode, etc.) in which a relatively small component configuration is activated or implemented. The second mode (e.g., current protection mode, etc.) can include a current limiting operation. The relatively small component configuration of the current protection mode can include a relatively increased gate to source voltage as compared to an attempt utilizing a relatively large component configuration in the current protection mode. In one embodiment, the increased gate source voltage moves operation of the relatively small component configuration into a region of characteristics with reduced propensity for thermal run away.

In block 630, components of a device are configured for operation in a third mode which includes reducing current to at least some of the components of the device. In one embodiment, the third mode turns a component off or blocks current flow to mitigate or handle an over-current or short circuit condition.

Thus, presented systems and methods can facilitate efficient switching and current protection. In one embodiment, a normal mode enables low resistance operation and a current limiting mode enables current protection with minimal or no thermal run-away. When an over-current or short circuit condition occurs, a configuration adjustment in a current limiting mode can enable continued operation at a greater predefined current level safely instead of immediately shutting off the power completely to the device and if a situation arises in the current limit mode in which it is not safe, the current can be completely blocked or turned off.

Portions of the detailed description are presented and discussed in terms of a method. Although steps and sequencing thereof are disclosed in figures herein describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed within a computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps include physical manipulations of physical quantities. Usually, though not necessarily, these quantities take the form of electrical, magnetic, optical or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "processing", "computing", "calculating", "determining", "displaying", "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Some embodiments may be described in the general context of computer-executable instructions, such as program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A system comprising:
   an input component operable to receive a signal;
   a control component comprising an amplifier, a switch, a control transistor and sense transistor;
   an adjustable component coupled to the input component, the adjustable component configurable to operate:
     in a first mode which includes a low resistance; and
     in a second mode including a current limiting operation in which the second mode enables continued operation in a condition that is unsafe for operation in the first mode, wherein the condition includes potential thermal runaway, wherein the adjustable component comprises:
       a small transistor component coupled to the amplifier; and
       a large transistor component coupled to the switch, wherein the large transistor component is relatively large with respect to the small transistor component;
     wherein if an over-current condition is detected the switch opens disconnecting the large transistor component from the small transistor component and the sense transistor while the control transistor turns on and shorts the gate of large transistor component to the input component; and
   gates of the small transistor component and the sense transistor are regulated to support a designated current limit level; and
   an output component coupled to the adjustable component, the output component operable to forward a signal.

2. The system of claim 1 wherein the adjustable component is configurable to turn off when the condition becomes unsafe to operate in both the first mode and the second mode.

3. The system of claim 1 in which the first mode includes a relatively low drain to source on resistance compared to the second mode.

4. The system of claim 1 in which the second mode includes a relatively small component configuration that has an increased gate to source voltage compared to an attempt utilizing a relatively large component configuration in the second mode.

5. The system of claim 1, wherein the control component includes:
   the amplifier coupled to the input component;
   a first resistor and a second resistor coupled to the amplifier;
   a current source coupled to the first resistor;
   the control transistor coupled to the amplifier;
   the sense transistor coupled to the amplifier; and
   the switch coupled to the amplifier.

6. The system of claim 5 wherein the sense transistor, the small transistor component, the large transistor component share drain connections with the gates of the sense transistor and small transistor coupled to one another.

7. The system of claim 5 wherein the amplifier is an error amp of a control loop.

8. The system of claim 5 wherein the switch is closed during normal operation and the switch connects a gate of the large transistor component to gates of the sense transistor and the small transistor component.

9. A protection process comprising:
   performing a current monitoring process; and
   performing a configuration process of an integrated system comprising a first transistor and second transistor, wherein the second transistor is relatively large with respect to the first transistor, wherein if an over-current condition is detected a switch opens disconnecting the second transistor from the first transistor and a sense transistor while a control transistor turns on and shorts the gate of second transistor to an input component; and
   gates of the first transistor and the sense transistor are regulated to support a designated current limit level, in which one configuration enables continued operation of the integrated system in conditions that are unsafe for operation in another configuration, wherein the conditions that are unsafe for operation include a potential thermal runaway within the integrated system, wherein an implementation of the one configuration and the other configuration is based upon results of the current monitoring process.

10. The protection process of claim 9 wherein the configuration process comprises:
    configuring components of a device to operate in a normal mode in which a relatively large component configuration is activated or implemented;

configuring components of a device to operate in a current protection mode in which a relatively small component configuration is activated or implemented; and configuring components of a device for operation in a third mode which includes reducing current to at least some of the components of the device.

11. The protection process of claim 10 wherein the large component configuration is implemented with a relatively low drain to source on resistance when in the on state (Rds-on) as compared to the second mode.

12. The protection process of claim 10 wherein the relatively small component configuration includes a relatively increased gate to source voltage as compared utilizing the relatively large component configuration in the current protection mode.

13. The protection process of claim 12 wherein the increased gate source voltage moves operation of the relatively small component configuration into a region of characteristics with reduced propensity for thermal run away.

14. An integrated system comprising:

an integrated control component comprising an amplifier, a switch, a control transistor and sense transistor; the integrated control component configured to control a characteristic change, including changing characteristics that enable continued operation in conditions that are unsafe for operation under different characteristics, wherein an integrated adjustable component can be dynamically changed between a normal mode configuration and a current limiting mode configuration, in which the normal mode configuration includes a low resistance characteristic and the current limiting mode configuration includes detrimental current protection and thermal run-away protection within the integrated system; and the integrated adjustable component of the integrated system comprising:

a first transistor component coupled to an amplifier; and a second transistor component coupled to a switch, wherein the second transistor component is relatively large with respect to the first transistor component;

wherein if an over-current condition is detected the switch opens disconnecting the second transistor component from the first transistor component and the sense transistor while the control transistor turns on and shorts the gate of second transistor component to an input component; and gates of the first transistor component and the sense transistor are regulated to support a designated current limit level.

15. The system of claim 14 wherein the integrated control component includes a control loop and the sense transistor and the integrated control component is configured to detect an adverse current condition and direct a configuration change in the integrated adjustable component to protect against the adverse current condition.

16. The system of claim 14 wherein at least some configurations of the adjustable component configurations include an interdigitated design.

* * * * *